(12) United States Patent
Ruan et al.

(10) Patent No.: US 10,697,487 B2
(45) Date of Patent: Jun. 30, 2020

(54) DEVICE FOR AUTOMATICALLY ASSEMBLING SHELL AND MIDDLE FRAME BY GLUE AND USE METHOD THEREOF

(71) Applicant: Shanghai Runmi Technology Co., Ltd., Shanghai (CN)

(72) Inventors: Ruping Ruan, Jiaxing (CN); Jidong Yang, Shanghai (CN); Xuan Feng, Shanghai (CN); Lili Jiang, Shanghai (CN); Yiran Qian, Shanghai (CN); Shichang Mao, Shanghai (CN); Dongping Zhang, Shanghai (CN); Zhixin Liu, Shanghai (CN); Su Zhang, Shanghai (CN); Jinsong Fan, Shanghai (CN)

(73) Assignee: SHANGHAI RUNMI TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 16/436,940

(22) Filed: Jun. 11, 2019

(65) Prior Publication Data

US 2019/0383317 A1    Dec. 19, 2019

(30) Foreign Application Priority Data

Jun. 19, 2018    (CN) .......................... 2018 1 0627296

(51) Int. Cl.
*F16B 11/00*    (2006.01)
*B05C 5/00*    (2006.01)
*B05C 13/02*    (2006.01)
*A45C 5/03*    (2006.01)
*A45C 13/04*    (2006.01)

(52) U.S. Cl.
CPC ............ *F16B 11/006* (2013.01); *B05C 5/002* (2013.01); *B05C 13/02* (2013.01); *A45C 5/03* (2013.01); *A45C 2005/037* (2013.01)

(58) Field of Classification Search
USPC ....................................................... 156/578
See application file for complete search history.

(56) References Cited

U.S. PATENT DOCUMENTS

2019/0275780 A1 * 9/2019 Cucchi ..................... B27D 3/02

* cited by examiner

*Primary Examiner* — Sing P Chan
(74) *Attorney, Agent, or Firm* — Bayramoglu Law Offices LLC

(57) ABSTRACT

A device for automatically assembling a shell and a middle frame by glue includes a locating mechanism of the middle frame, a glue coating mechanism, a feed mechanism, a press-in mechanism, and a pressure-keeping mechanism. Components to be assembled are transferred among the locating mechanism of the middle frame, the glue coating mechanism, the feed mechanism, the press-in mechanism, and the pressure-keeping mechanism through manipulators. An automatic assembly line is formed by the device to assemble various components of the case body, which considerably reduces the manual assembly cost, simplifies the complicated assembly process, effectively shortens the whole production period, and improves the production efficiency.

6 Claims, 7 Drawing Sheets

DEVICE FOR AUTOMATICALLY ASSEMBLING SHELL AND MIDDLE FRAME BY GLUE AND USE METHOD THEREOF

CROSS REFERENCE TO THE RELATED APPLICATIONS

This application is based upon and claims priority to Chinese Patent Application No. 201810627296.8, filed on Jun. 19, 2018, the entire contents of which are incorporated herein by reference.

TECHNICAL FIELD

The present invention relates to the equipment suitable for assembly, specifically, relates to a device for automatically assembling a shell and a middle frame by glue and a use method thereof.

BACKGROUND

With the continuous development of technology, and the increasing progress of society, people's living standard improves rapidly. Before starting a trip or when there is a need to pack something with a large volume, people usually use suitcases to pack their necessities to facilitate the trip. Hence, suitcases have been widely used. In order to adapt to the market demand, the production process of a suitcase generally includes two parts, i.e., processing a case body, and assembling components. Currently, manufacturers produce a main body of the case body independently, subsequently, other components and the main body are assembled by manual work. This production method has a high cost, a long production period, and a low production efficiency. Moreover, a large amount of components are needed to be assembled, leading to a complicated assembly process which is not suitable for large-scale production and has poor practicability.

As we know, suitcases are classified as zipper-type suitcases and frame-type suitcases based on the connection mode. The machine sewing process of the zipper-type suitcase is complicated, and mainly depends on manual work, greatly reducing the production efficiency of the suitcase. Moreover, the zipper-type suitcases have relatively poor mechanical strength, and are prone to deformation. For the frame-type suitcases, an upper frame is used to be fixedly connected to an upper shell of the suitcase through multiple rivets, and a lower frame is used to be fixedly connected to a lower shell of the suitcase by several rivets. However, the fixing process of the rivets consumes a lot of manpower and material resources. In order to improve the processing efficiency of the assembly between the shell of the suitcase and the middle frame, the present invention provides a device for assembling a shell and a middle frame using a frame glue connection instead of a machine sewing process or a rivet connection process.

SUMMARY

To overcome the drawbacks of the prior art, an objective of the present invention is to provide a device for automatically assembling a shell and a middle frame by glue and a use method thereof.

On a first aspect, the present invention provides a device for automatically assembling a shell and a middle frame by glue, including a locating mechanism of middle frame, a glue coating mechanism, a feed mechanism, a press-in mechanism and a pressure-keeping mechanism.

Specifically:

components to be assembled are transferred among the locating mechanism of middle frame, the glue coating mechanism, the feed mechanism, the press-in mechanism and the pressure-keeping mechanism through manipulators.

Preferably, the locating mechanism of the middle frame includes the locating template (1) and the middle frame fixing mechanism (2).

A surface of the locating template (1) is provided with the sunk locating groove (3), and the sunk locating groove (3) is arranged in a containing part of the middle frame fixing mechanism (2).

The middle frame fixing mechanism (2) includes the cylinders (4), and the holding device (5). The holding device (5) is provided on a main body of the middle frame fixing mechanism (2) to perform a clamping operation through movements of the cylinders (4). The holding device (5) includes two clamps obliquely configured on an edge of a frame and a clamp vertically configured on the edge of the frame.

Preferably, the glue coating mechanism includes the glue coating nozzle (6), the slide rail (7) and the guide rail (8).

The glue coating nozzles (6) are provided to slide along the slide rail (7), and the locating template can slide along the guide rail (8).

Preferably, the feed mechanism includes the inner guide blocks (9), the outer guide blocks (10), the precise guide rails (11), the moving cylinders (12) and the limit and locating blocks (13).

The inner guide blocks (9) are provided on an inner side of the shell A, the outer guide blocks (10) are provided on an outer side of the shell A, and the inner guide blocks (9) and the outer guide blocks (10) fix the shell A in the glue groove C of the middle frame B.

The moving cylinder (12) drives the inner guide blocks (9) to move along the precise guide rails (11) to positions of the limit and locating blocks (13).

The limit and locating blocks (13) are provided on lower parts of the outer guide blocks (9).

Preferably, the press-in mechanism includes the press-in support brackets (14), the press-down actuators (15), the precise guide rails (16), the press-down cylinder bases (17), the press bases (18) and the press plates (19).

The precise guide rails (16) are fixed on the press-in support brackets (14).

The connecting rods are provided on the press-down actuators (15), and the stretching and retracting of the connecting rods drive the press-down cylinder bases (17) to move, making the press bases (18) and press plates (19) move up and down.

The press plates (19) are fixed on lower parts of the press bases (18), and the press bases (18) move up and down along the precise guide rails (16).

Preferably, the pressure-keeping mechanism includes the shell fixing baseplate (20), the pressure-keeping platform (21), the guide columns (22), and the lifting cylinders (23).

The shell fixing baseplate (20) is provided with the sunk locating groove (24).

The guide columns (22) are provided with pressure springs.

The lifting cylinders (23) are located on two sides of the pressure-keeping platform (21).

The working principle is as follows. The pressure-keep platform (21) is lifted to a predetermined height through the lifting cylinders (23). The shell A and the middle frame B are assembled, and then put in the locating groove (24) of the shell fixing baseplate (20). Subsequently, the lifting cylinders (23) are released. At this time, the press springs of the guide columns (22) apply pressure on the shell A through the pressure-keeping platform (21). After keeping the pressure for a predetermined time period, the pressure-keeping platform (21) is lifted by the lifting cylinders (23), the assembly of the shell A and the middle frame B can be taken out at this time.

On a second aspect, the present invention further relates to a use method of the above-mentioned device for automatically assembling the shell and the middle frame by the glue, including the following steps:

step 1, putting the middle frame on the locating mechanism of the middle frame by the manipulators, and then clamping to fix the middle frame;

step 2, performing a glue coating operation on the middle frame through the glue coating mechanism;

step 3, putting the shell on the feed mechanism by the manipulators, introducing the shell into the glue groove of the middle frame, and then clamping to fix the shell;

step 4, pressing the shell toward the middle frame through the press-in mechanism; and step 5, transferring an assembly of the shell and the middle frame to the pressure-keeping mechanism through the manipulators, pressing the assembly of the shell and the middle frame to maintain a pressure.

Compared with the prior art, the present invention has the following advantages.

The objective of the present invention is to provide a device for automatically assembling suitcases. An automatic assembly line is formed by the device for the assembly of various components of the case body, which considerably reduces the manual assembly cost, simplifies the complicated assembly process, effectively shortens the whole production period, and improves the production efficiency. Therefore, the device facilitates the production and use, and has strong practicability.

BRIEF DESCRIPTION OF THE DRAWINGS

In order to make the above and other objectives, features, and advantages of the present invention clear, non-limiting embodiments are described hereinafter with reference to the drawings.

DETAILED DESCRIPTION OF THE EMBODIMENTS

The present invention is described hereinafter with reference to the following specific embodiments. The following embodiments will help those skilled in the art to further understand the present invention without limiting the present invention in any way. It should be noted that, as to those skilled in the art, several variations and modifications may be made without departing from the spirit and scope of the invention, which should be considered as falling within the scope of the present invention.

EMBODIMENT

Figure 1:
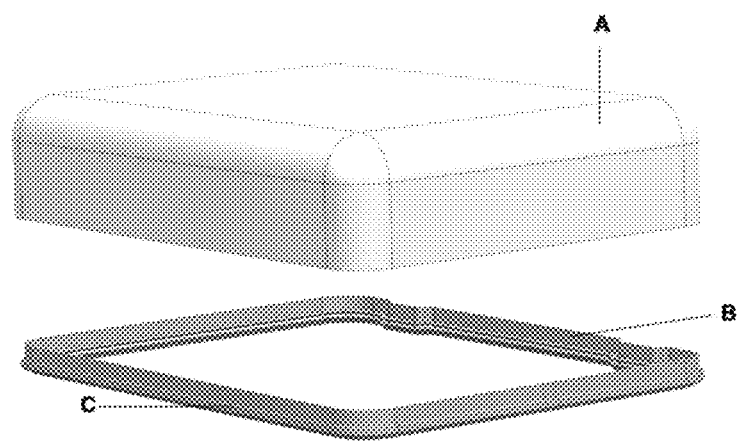
FIG. 1 is an exploded view of a shell and a middle frame according to the present invention.
Figure 2:
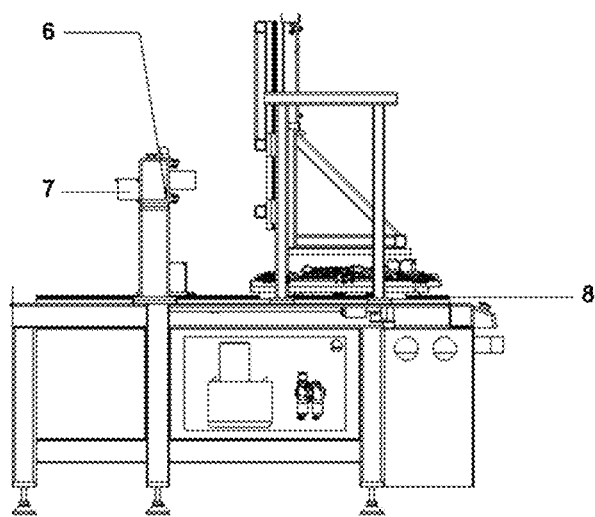
FIG. 2 is a structural diagram of a glue coating mechanism according to the present invention.
Figure 3:
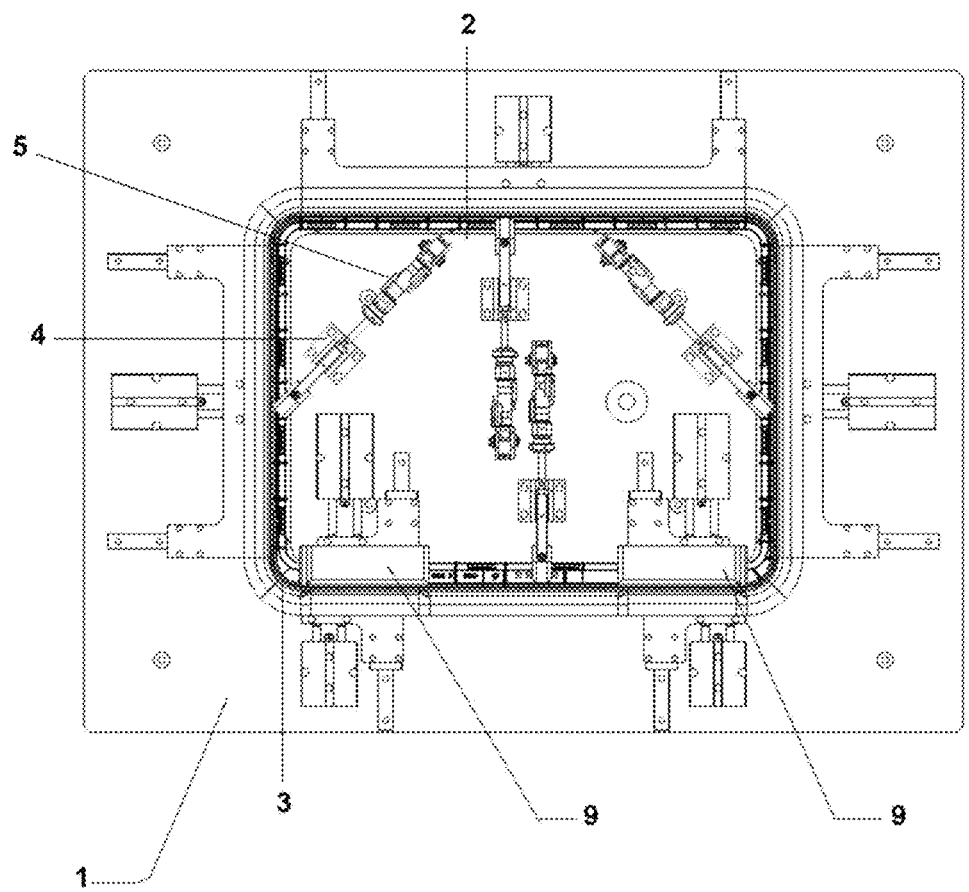
FIG. 3 is a structural diagram of a locating mechanism of a middle frame according to the present invention.
Figure 4:
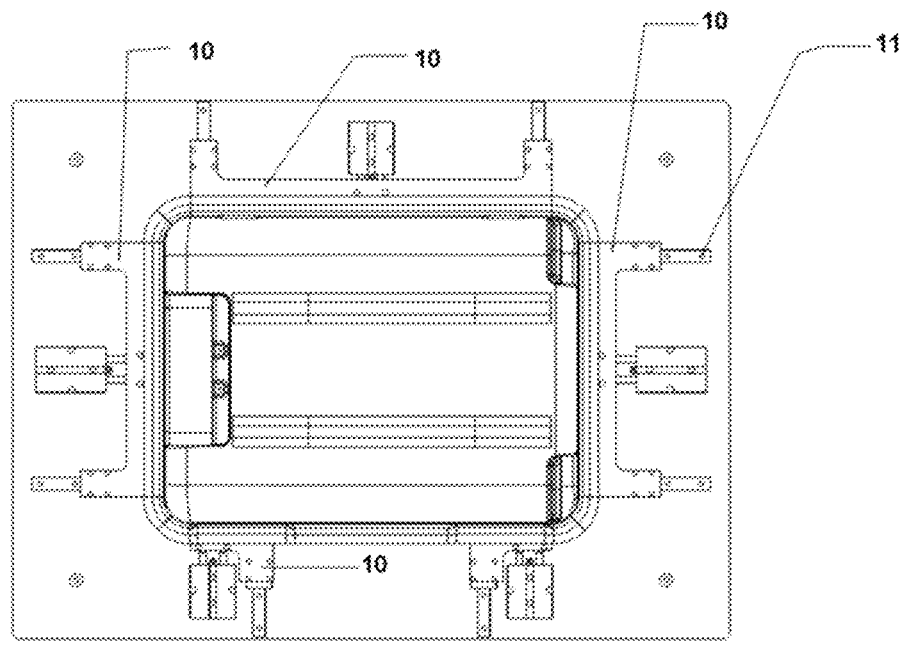
FIG. 4 is a structural diagram of a feed mechanism according to the present invention.
Figure 5:
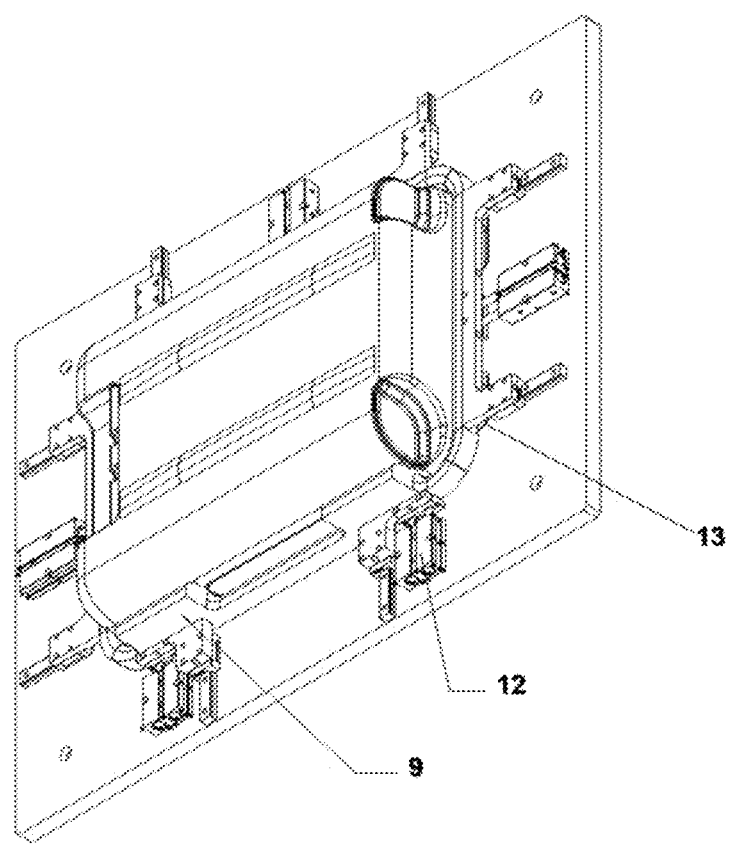
FIG. 5 is a back view of a feed mechanism according to the present invention.
Figure 6:
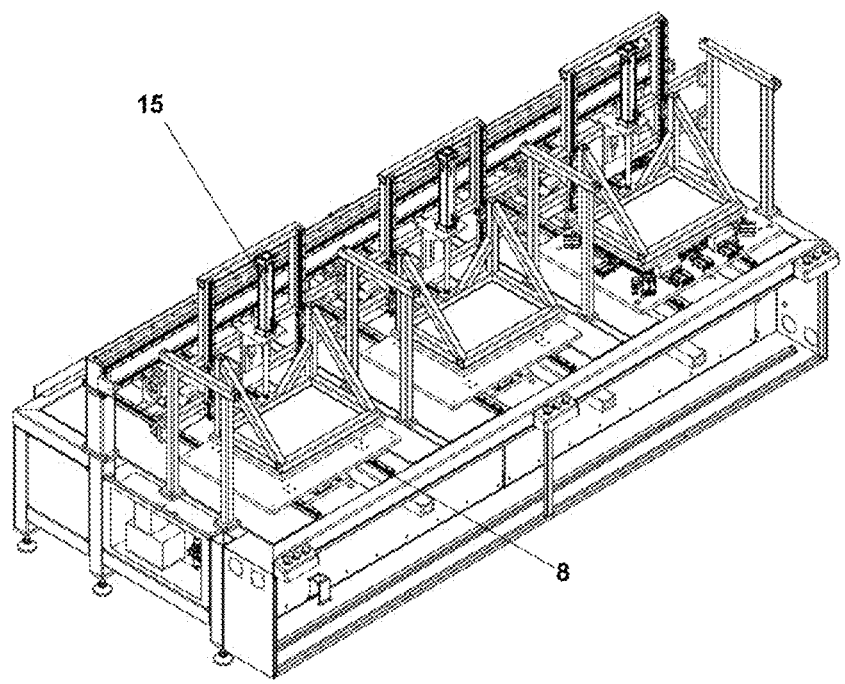
FIG. 6 is a schematic diagram of a pressure-keeping mechanism according to the present invention.
Figure 7:
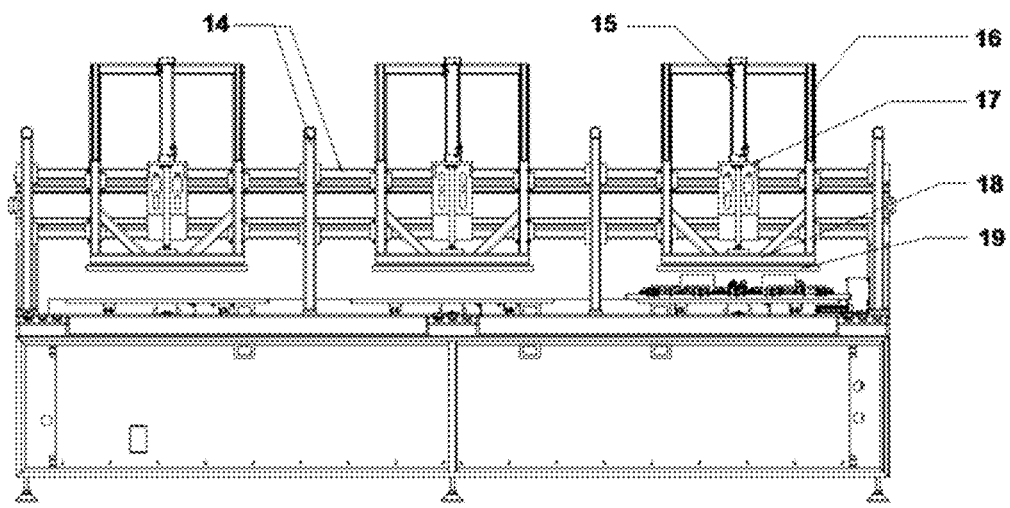
FIG. 7 is a side view of a pressure-keeping mechanism according to the present invention.
Figure 8:
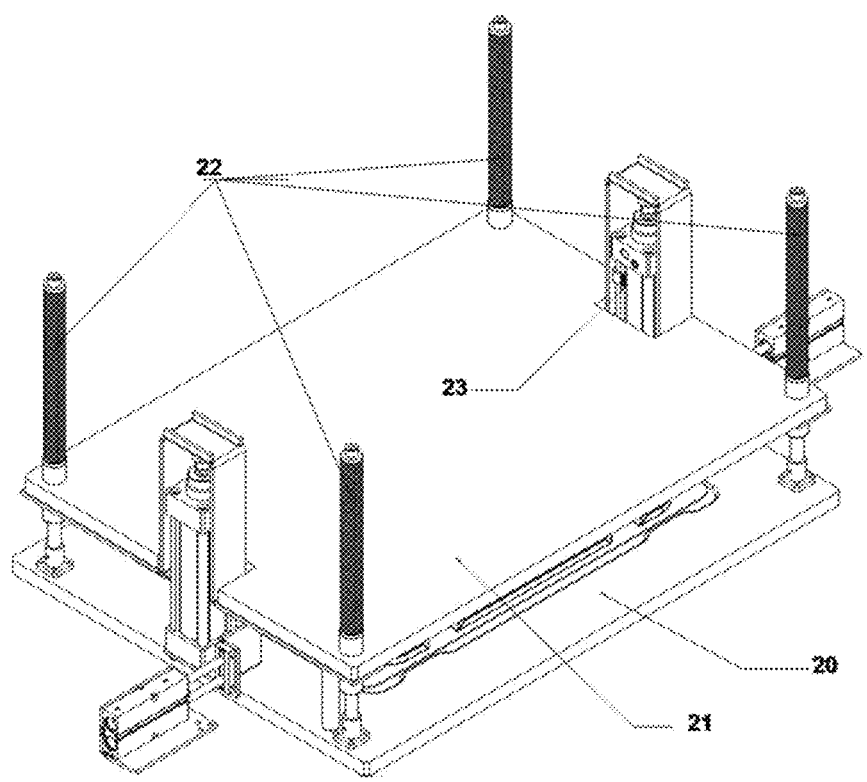
FIG. 8 is a schematic diagram of a feed mechanism according to the present invention.
Figure 9:
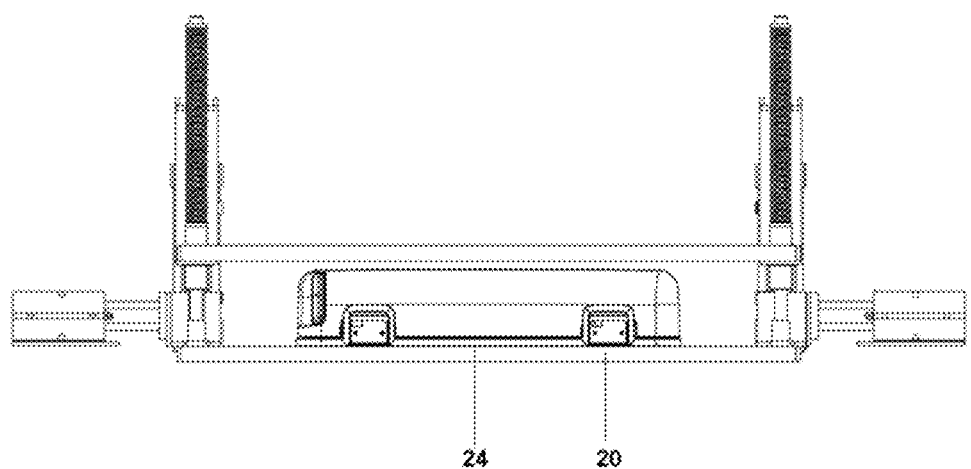
FIG. 9 is a front view of a feed mechanism according to the present invention.

The present embodiment relates to a device for automatically assembling a shell and a middle frame by glue, as shown in FIG. 1, FIG. 2, FIG. 3, FIG. 4, FIG. 5, FIG. 6, FIG. 7, FIG. 8, and FIG. 9. The device includes the locating mechanism of the middle frame, the glue coating mechanism, the feed mechanism, the press-in mechanism, and the pressure-keeping mechanism.

Specifically:

the components to be assembled are transferred among the locating mechanism of the middle frame, the glue coating mechanism, the feed mechanism, the press-in mechanism and the pressure-keeping mechanism by manipulators.

Preferably, the locating mechanism of the middle frame includes the locating template 1, and the middle frame fixing mechanism 2.

A surface of the locating template 1 is provided with the sunk locating groove 3, and the locating groove 3 is arranged in a containing part of the middle frame fixing mechanism 2.

The middle frame fixing mechanism 2 includes the cylinders 4, and the holding device 5. The holding device 5 is provided on a main body of the middle frame fixing mechanism 2 to implement holding/clamping operation through movements of the cylinders 4, and the holding device 5 includes two clamps obliquely configured on an edge of a frame and a clamp vertically configured on the edge of the frame.

Preferably, the glue coating mechanism includes the glue coating nozzles 6, the slide rails 7, and the guide rails 8.

The nozzles 6 are provided to slide along the slide rails 7, and the locating template 1 can slide along the guide rails 8.

Preferably, the feed mechanism includes the inner guide blocks 9, the outer guide blocks 10, the precise guide rails 11, the moving cylinders 12, and the limit and locating blocks 13.

The inner guide blocks 9 are provided on an inner side of the shell A, the outer guide blocks 10 are provided on an outer side of the shell A, and the inner guide blocks 9 and the outer guide blocks 10 fix the shell A inside the glue groove C of the middle frame B.

The moving cylinders 12 drive the inner guide block 9 to move along the precise guide rails 11 to positions of the limit and fixing blocks 13.

The limit and locating blocks 13 are provided on lower parts of the outer guide blocks 10.

Preferably, the press-in mechanism includes the press-in support brackets 14, the press-down actuators 15, the precise guide rails 16, the press-down cylinder bases 17, the press bases 18, and the press plates 19.

The precise guide rails 16 are fixed on the press-in support brackets 14.

The press-down actuators 15 are provided with connecting rods, and the press-down cylinder bases 17 are driven to move by the stretching and retracting of the connecting rods to make the press bases 18 and the press plates 19 move up and down.

The press plates 19 are fixed on lower parts of the press bases 18, and the press bases 18 move up and down along the precise guide rails 16.

Preferably, the pressure-keeping mechanism includes the shell fixing baseplate 20, the pressuring-keep platform 21, the guide columns 22, and the lifting cylinders 23.

The sunk locating groove 24 is provided on the shell fixing baseplate 20.

Pressure springs are provided on the guide columns 22.

The lifting cylinders 23 are provided on both sides of the pressure-keeping platform 21.

The working principle is as follows. The pressure-keeping platform 21 is lifted to a predetermined height through the lifting cylinders 23. The shell A and the middle frame B are assembled, and then put in the locating groove 24 of the shell fixing baseplate 20. Subsequently, the lifting cylinders 23 are released. At this time, the press springs of the guide columns 22 apply pressure on the shell A through the pressure-keeping platform 21. After keeping the pressure for a predetermined time period, the pressure-keeping platform 21 is lifted by the lifting cylinders 23. The assembly of the shell A and the middle frame B can be taken out at this time.

The present invention further relates to a use method of the above-mentioned device for automatically assembling the shell and the middle frame by the glue, including the following steps:

step 1, the middle frame is put on the locating mechanism of the middle frame by manipulators, and then the middle frame is clamped and fixed;

step 2, a glue coating operation is performed through the glue coating mechanism;

step 3, the shell is put on the feed mechanism by the manipulators to be introduced into the glue groove of the middle frame, and the shell is clamped and fixed;

step 4, the shell is pressed toward the middle frame through the press-in mechanism; and step 5, an assembly of the shell and the middle frame is transferred to the pressure-keeping mechanism through the manipulators, the assembly of the shell and the middle frame is compressed for maintaining a pressure.

Compared with the prior art, the present invention has the following advantages. The present invention aims to provide a device for automatically assembling suitcases. An automatic assembly line is formed by the device to assemble various components of the case body, which considerably reduces the cost of manual assembly, simplifies the complicated assembly process, effectively shortens the whole production period, and improves the production efficiency. Therefore, the device facilitates the production and use, and has strong practicability.

The embodiment of the present invention is described as above. It should be understood that the present invention is not limited to any specific embodiment mentioned above. Various changes and modifications may be made by those skilled in the art within the scope of the claims of the present invention, which won't affect the essences of the present invention.

What is claimed is:

1. A device for automatically assembling a shell and a middle frame by glue, comprising: a locating mechanism of the middle frame, a glue coating mechanism, a feed mechanism, a press-in mechanism, and a pressure-keeping mechanism; wherein a plurality of components to be assembled are transferred among the locating mechanism of the middle frame, the glue coating mechanism, the feed mechanism, the press-in mechanism, and the pressure-keeping mechanism through manipulators, wherein the locating mechanism of the middle frame comprises a locating template and a middle frame fixing mechanism;

a surface of the locating template is provided with a sunk locating groove, and the sunk locating groove is arranged in a containing part of the middle frame fixing mechanism; and the middle frame fixing mechanism comprises cylinders, and a holding device, the holding device is provided on a main body of the middle frame fixing mechanism to implement a holding clamping operation through movements of the cylinders, and the holding device comprises two clamps obliquely configured on an edge of a frame and a clamp vertically configured on the edge of the frame.

2. The device for automatically assembling the shell and the middle frame by the glue according to claim 1, wherein the glue coating mechanism comprises glue coating sprays, first slide rails, second guide rails; and the glue coating spays are provided to slide along the first slide rails, and the locating templates slide along the second guide rails.

3. The device for automatically assembling the shell and the middle frame by the glue according to claim 1, wherein the feed mechanism comprises inner guide blocks, outer guide blocks, precise guide rails, moving cylinders, and limit and locating blocks;

the inner guide blocks are provided on an inner side of the shell, the outer guide blocks are provided on an outer side of the shell, and the inner guide blocks and the outer guide blocks fix the shell in a glue groove of the middle frame;

the moving cylinders drive the inner guide blocks to move along the precise guide rails to positions of the limit and locating blocks; and the limit and locating blocks are provided on lower parts of the outer guide blocks.

4. The device for automatically assembling the shell and the middle frame by the glue according to claim 1, wherein the press-in mechanism comprises press-in support brackets, press-down actuators, precise guide rails, press-down cylinder bases, press bases, and press plates;

the precise guide rails are fixed on the press-in support brackets;

the press-down actuators are provided with connecting rods, the press-down cylinders bases are driven to move by stretching and retracting of the connecting rods to make the press bases and the press plates move up and down; and the press plates are fixed on lower parts of the press bases, the press bases move up and down along the precise guide rails.

5. The device for automatically assembling the shell and the middle frame by the glue according to claim 1, wherein the pressure-keeping mechanism comprises a shell fixing baseplate, a pressuring-keep platform, guide columns, and lifting cylinders;

a sunk locating groove is provided on a shell fixing baseplate;

pressure springs are provided on the guide columns;

the lifting cylinders are provided on both sides of a pressure-keeping platform; and a lifting of each of the lifting cylinders drives the pressure-keeping platform to be lifted, while the pressure springs on the guide columns are compressed.

6. A method of using a device for automatically assembling a shell and a middle frame by the glue according to claim 1, comprising the following steps:

step 1, putting a middle frame on a locating mechanism of the middle frame by the manipulators, and then clamping to fix the middle frame;

step 2, performing a glue coating operation through a glue coating mechanism;

step 3, putting the shell on a feed mechanism by the manipulators, introducing the shell into a glue groove of the middle frame, and then clamping to fix the shell;

step 4, pressing the shell toward the middle frame through a press-in mechanism; and step 5, transferring an assembly of the shell and a middle frame to the pressure-keeping mechanism through the manipulators, and compressing the assembly of the shell and the middle frame for maintaining a pressure:

wherein the device for automatically assembling the shell and the middle frame by the glue comprises the locating mechanism of the middle frame, the glue coating mechanism, the feed mechanism, the press-in mechanism, and the pressure-keeping mechanism; components to be assembled are transferred among the locating mechanism of the middle frame, the glue coating mechanism, the feed mechanism, the press-in mechanism, and the pressure-keeping mechanism through the manipulators.

* * * * *